(12) United States Patent
Armitage et al.

(10) Patent No.: US 9,424,726 B2
(45) Date of Patent: Aug. 23, 2016

(54) SYSTEM AND METHOD FOR GLOBAL SAFETY COMMUNICATION

(71) Applicant: Cartasite, Inc., Denver, CO (US)

(72) Inventors: David Armitage, Golden, CO (US); Mark Mason, Thornton, CO (US)

(73) Assignee: CARTASITE, INC., Denver, CO (US)

( * ) Notice: Subject to any disclaimer, the term of this patent is extended or adjusted under 35 U.S.C. 154(b) by 367 days.

(21) Appl. No.: 14/036,275

(22) Filed: Sep. 25, 2013

(65) Prior Publication Data
US 2014/0091924 A1   Apr. 3, 2014

Related U.S. Application Data

(60) Provisional application No. 61/708,910, filed on Oct. 2, 2012.

(51) Int. Cl.
*G08B 1/08* (2006.01)
*G08B 21/02* (2006.01)
*G08B 21/04* (2006.01)
*G08B 25/00* (2006.01)
*G06F 1/00* (2006.01)

(52) U.S. Cl.
CPC ........... *G08B 21/02* (2013.01); *G08B 21/0415* (2013.01); *G08B 25/009* (2013.01); *G06F 1/00* (2013.01); *G06F 2101/00* (2013.01)

(58) Field of Classification Search
CPC ............................... G06F 1/00; G06F 2101/00
See application file for complete search history.

(56) References Cited

U.S. PATENT DOCUMENTS

| 2002/0002426 A1* | 1/2002 | Burkhard ................ E21B 44/00 |
| | | 700/286 |
| 2011/0007443 A1* | 1/2011 | Crookham ............. H02H 3/347 |
| | | 361/93.2 |
| 2011/0181422 A1* | 7/2011 | Tran .................... G06F 19/3418 |
| | | 340/573.1 |

* cited by examiner

*Primary Examiner* — Shirley Lu
(74) *Attorney, Agent, or Firm* — Thomas A. Dougherty

(57) ABSTRACT

Systems and methods are provided herein describe a global safety system for workers in hazardous locations such as electrical Class 1/Division 1 locations. In at least one example, a user will carry a user device that is approved for the hazardous electrical locations. This device will monitor for safety-triggering events such as a lack of user movement, a press of an emergency button, or any other indication of an emergency. Once a safety-triggering event is detected, the user device will transmit an alert to a user station outside of the hazardous electrical location. In turn, the user station will transmit an alert to a remote station regarding the status of the user device.

18 Claims, 4 Drawing Sheets

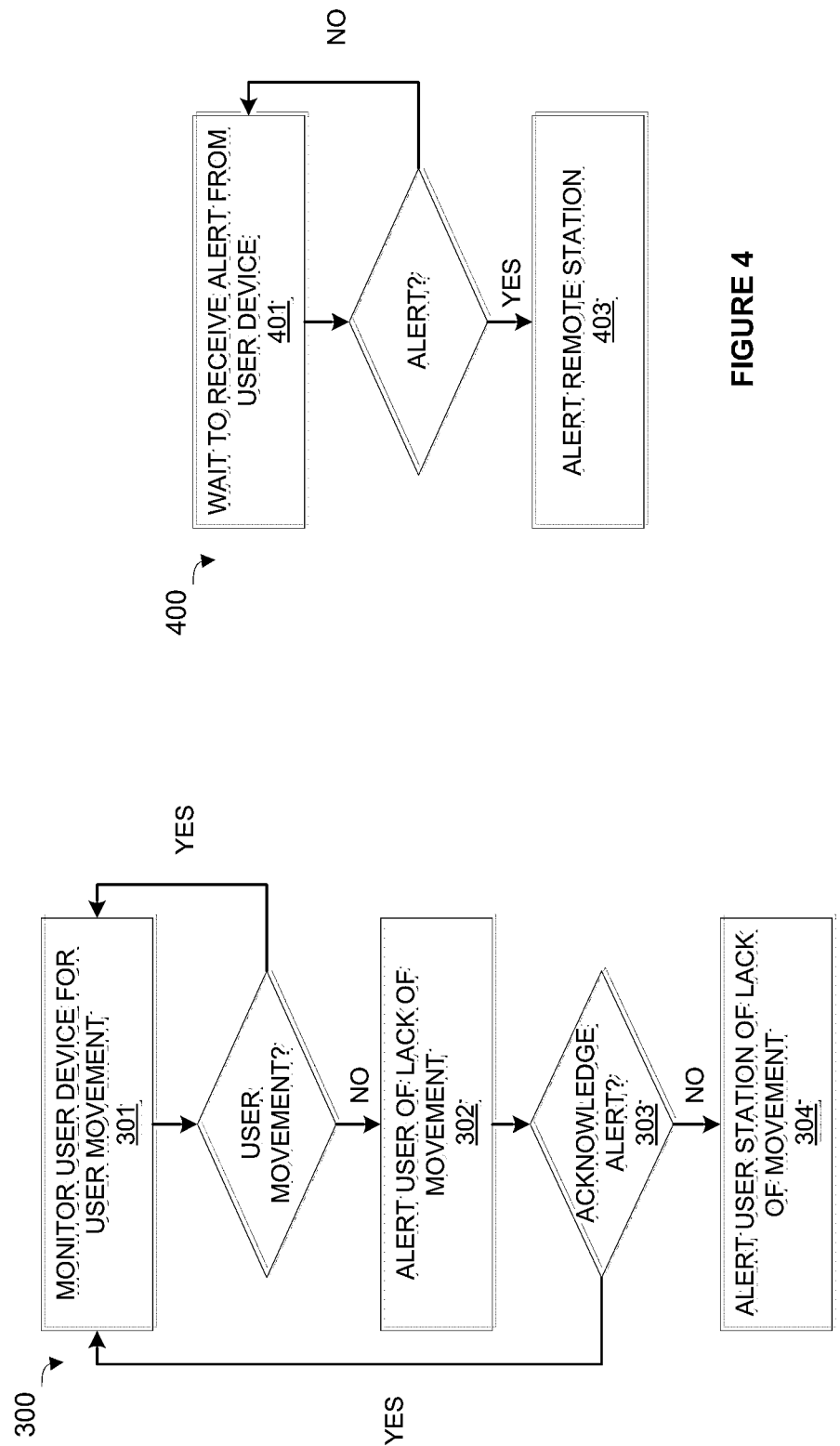

SYSTEM AND METHOD FOR GLOBAL SAFETY COMMUNICATION

CROSS REFERENCE TO RELATED APPLICATIONS

This application claims priority to, and benefit from, provisional patent application Ser. No. 61/708,910, entitled "SYSTEM AND METHOD FOR GLOBAL SAFETY COMMUNICATION", filed Oct. 2, 2012, which is incorporated by reference for all purposes.

TECHNICAL BACKGROUND

Global communication safety systems are designed to keep users connected and safe from anywhere on the planet. Current systems include a first device communicating via satellite to a second device when the first device receives a safety-triggering event. The safety-triggering event could be the pressing of a button, a sensor detecting a specific action, or any other method of triggering the communication between the two devices.

Once the safety-triggering event has been detected the first device will then transmit a signal or alert to the second device. This signal could include information such as the location of the first device, the type of safety-triggering event that occurred, or any other information that may be helpful regarding the situation at the first device. This information can then be used in monitoring or rescuing the user of the first device.

Additionally, hazardous locations exist where safety monitoring is a high priority and electronics in these locations are tightly controlled. Examples of hazardous locations include those classified as Class 1, Class 2, and Class 3 by the National Electric Code. Class 1 locations include petroleum refineries, gasoline storage, utility gas plants, and any other location with the presence of flammable gases or vapors. Further, the classes are divided into Division 1 locations and Division 2 locations. Division 1 locations are locations where the hazardous material would normally be present, whereas Division 2 locations are locations where the hazardous material would not normally be present.

OVERVIEW

A method of global communication includes monitoring a user device configured to operate in a hazardous electrical environment for a safety-triggering event, transmitting a first alert from the user device to a user station outside of the hazardous electrical environment upon the identification of the safety-triggering event; and transmitting a second alert from the user station to a remote station upon the user station receiving the first alert.

BRIEF DESCRIPTION OF THE DRAWINGS

FIG. 3 illustrates a flowchart for operating a user device for global communication according to one example.

FIG. 4 illustrates a flowchart for operating a user station for global communication according to one example.

DESCRIPTION

Systems and methods are provided herein to create a global safety system for workers in hazardous electrical locations such as Class 1/ Division 1 locations. In at least one example, a user will carry a user device that is approved for the hazardous electrical locations. This device will monitor for safety-triggering events such as a lack of user movement, a press of an emergency button, or any other indication of an emergency. Once a safety-triggering event is detected, the user device will transmit an alert to a user station outside of the hazardous electrical location. In turn, the user station will transmit an alert to a remote station regarding the status of the user device.

Figure 1:
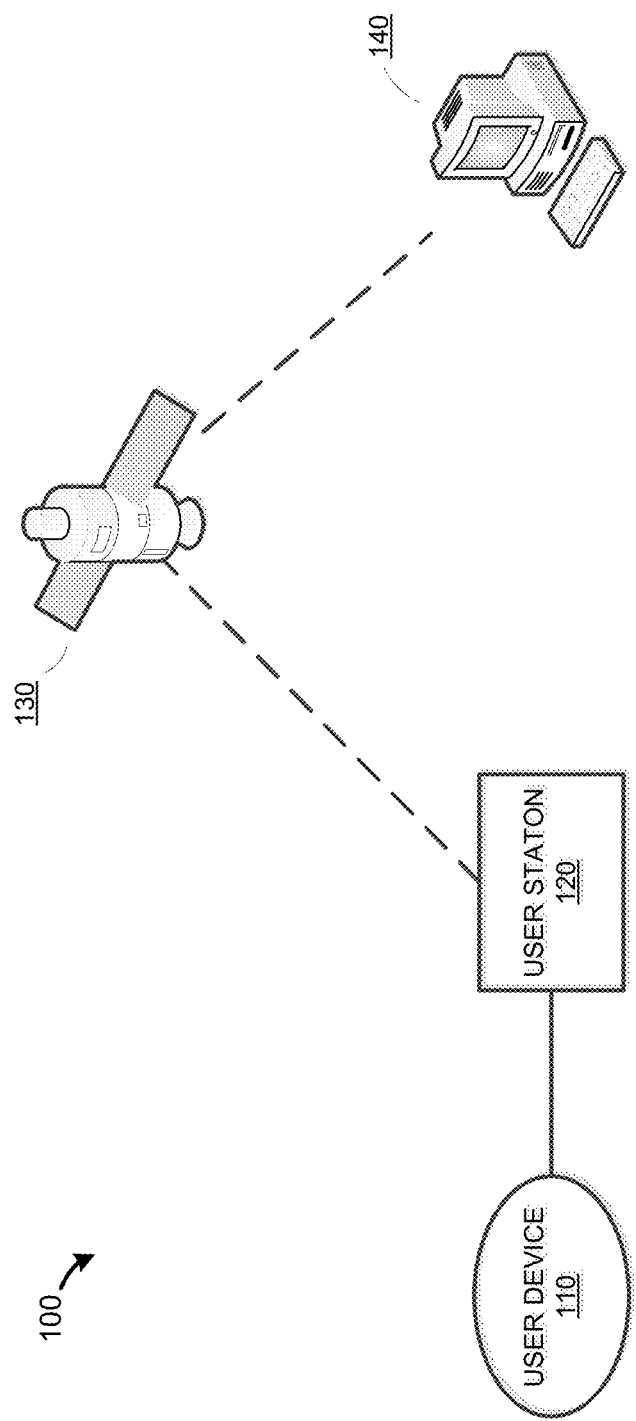
FIG. 1 illustrates a system for global communication according to one example.

FIG. 1 illustrates a global communication system 100 according to one example. System 100 includes user device 110, user station 120, satellite(s) 130, and remote station 140.

User device 110 is connected to user station 120 via a Bluetooth, Wi-Fi, cellular, radio frequency, short-wave, long-wave, or other form of wireless communication. In turn, user station 120 is connected to remote station 140 via satellite(s) 130.

User device 110 can be any device capable of being carried by a user and operating in a hazardous location such as a Class 1/ Division 1 location. User device 110 can be configured to monitor for safety-triggering events such as lack of movement from the user, a user triggering a button or a switch, or any other form of triggering event including combinations thereof. Further, user device 110 can be configured to transmit an alert to user station 120 upon detection of a safety-triggering event and can be configured to receive alerts from user station 120.

User station 120 can be any device capable of receiving alerts from user device 110, and capable of sending alerts to remote station 140. In one example, user station 120 can also be configured to receive alerts from remote station 140, and send alerts to user device 110.

Satellite(s) 130 can include one or more satellites capable of communicating alerts between user station 120 and remote station 140.

Remote station 140 can be any device capable of receiving alerts from user station 120 including a server computer, desktop computer, a tablet computer, a telephone, or any other device capable of receiving alerts from user station 120.

In one example, remote station 140 can transmit the alert from user station 120 to other devices such as server computers, desktop computers, tablet computers, telephones, or the like.

In one example, remote station 140 can be configured to transmit an alert to user station 120, which may be forwarded to user device 110.

Figure 2:
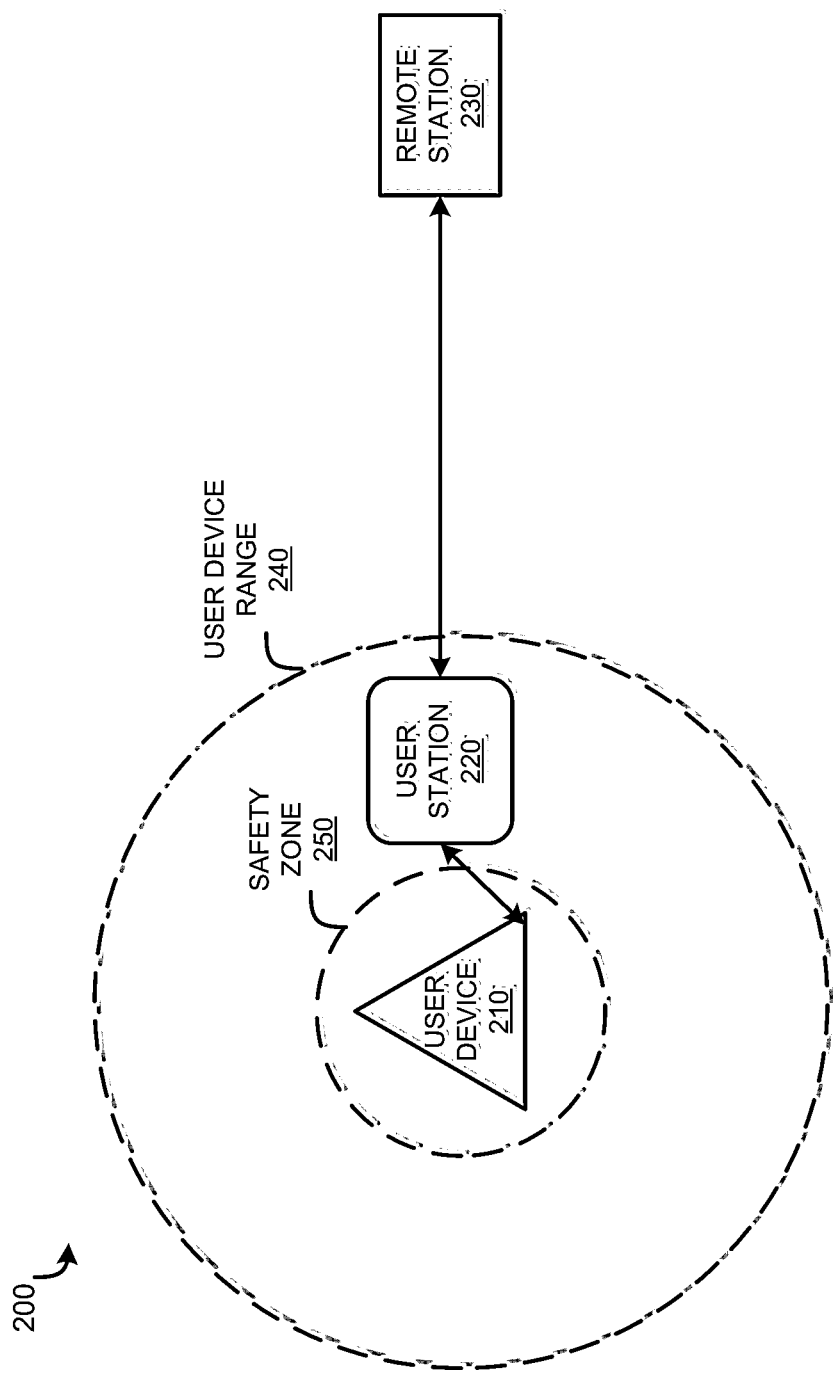
FIG. 2 illustrates a system for global communication according to one example.

FIG. 2 illustrates a global communication system 200 according to one example. System 200 includes user device 210, user station 220, and remote station 230.

User device 210 is connected to user station 220 via a Bluetooth, Wi-Fi, or other form of wireless communication. In turn, user station 220 is connected to remote station 230 via satellite communication network, Internet network, cellular network, or any other communication network including combinations thereof.

User device 210 can be any device capable being carried by a user and entering safety zone 250. Safety zone 250 may consist of a Class 1/ Division 1 location or any other hazardous electrical location. Additionally, user device 210 can be configured to monitor for safety-triggering events such as lack of movement from the user, a user triggering a button or a switch, or any other form of safety-triggering event including combinations thereof. Further, user device 210 can be configured to transmit an alert to user station 220 upon detection of a safety-triggering event and also, in at least one example, can be configured to receive alerts from user station 220.

User station 220 can be any device capable of receiving an alert from user device 210 from within the user device range 240, and capable of transmitting a second alert to remote station 230 upon receipt of an alert from user device 210. User station 220 may further be configured to receive alerts from remote station 230 and transmit alerts to user device 210.

Remote station 230 can be any device capable of receiving alerts from user station 220. These alerts may include the type of safety-triggering event that occurred, the location of the alert, as well as any other information about the status of user device 210 including combinations thereof. Remote station 230 may also be configured to transmit alerts to user station 220, which may be forwarded to user device 210, or safety personnel, or emergency medical personnel.

FIG. 3 illustrates a flowchart 300 for operating user device 210 according to one example. The method begins at step 301 by monitoring user device 210 for user movement within a certain amount of time. This monitoring could be done using accelerometers or any other method of tracking user movement. If movement has occurred in the certain amount of time, the system will return to monitoring for movement and reset the timer. However, if movement has not occurred the system will progress to step 302.

At step 302, user device 210 will alert the user of the lack of movement. This alert may either be audible in the form of a speaker on the device, a vibration, alert in the area, or any other method of notifying the user of a lack of movement.

Thereafter, at step 303, the system will determine if the user responded to, or otherwise acknowledged, the alert. The response could include shaking the device to activate the accelerometer, pressing a button, flipping a switch, or any other form of user interface to acknowledge the alert. If the user recognizes the alert, the system will return to step 301 and monitor for user movement. However, if the user does not recognize the alert, user device 210 will transmit an alert to user station 220 (step 304).

FIG. 4 illustrates a flowchart 400 for operating user station 220 according to one example. The method begins at step 401 by monitoring for an alert from user device 210. If an alert is not present the system will return to step 401. However, if an alert is presented from user device 210, the system will then transmit a second alert to remote station 230 indicating an issue at user device 210 (step 403). This alert could include the type of safety-triggering event that occurred, the location of the alert, as well as any other information about the status of user device 210 including combinations thereof.

Figure 5:
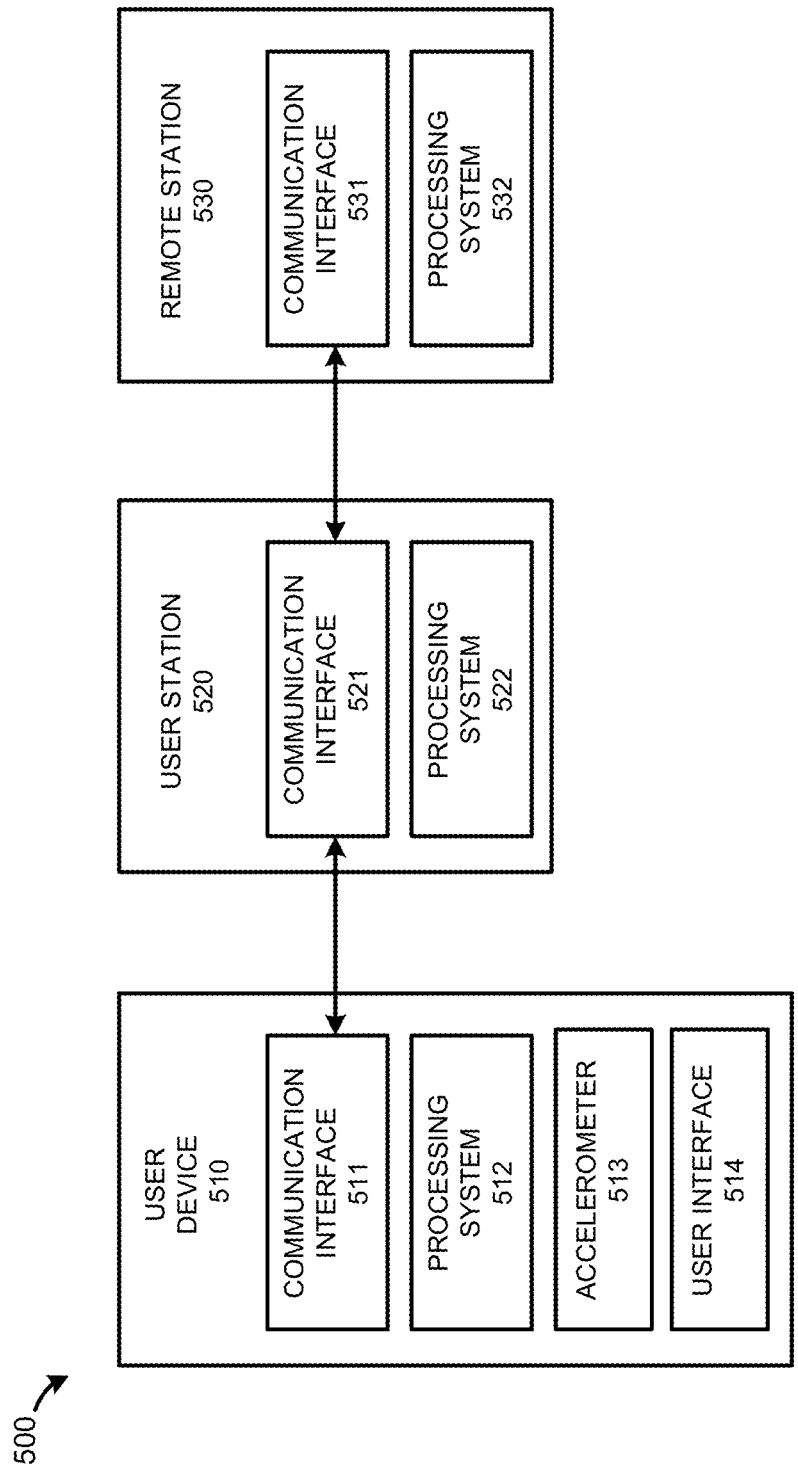
FIG. 5 illustrates a system for global communication according to one example.

FIG. 5 illustrates a global communication system 500 according to one example. Global communication system 500 comprises user device 510, user station 520, and remote station 530.

User device 510 is connected to user station 520 via a Bluetooth, Wi-Fi, or other form of wireless connection. In turn, user station 520 is connected to remote station 530 via satellite communication network, Internet network, cellular network, or any other communication network including combinations thereof.

In FIG. 5, user device 510 comprises communication interface 511, processing system 512, accelerometer 513, and user interface 514. Processing system 512 is configured to monitor data from accelerometer 513 and user interface 514 for safety-triggering events. These safety-triggering events could include a lack of movement as further described in FIG. 3, the user pressing an emergency button or switch, or any other safety-triggering event. When system 510 determines a safety-triggering event has occurred, system 512 directs communication interface 511 to transmit an alert to user station 520.

After the transmission of an alert from user device 510, the alert is received at user station 520. User station 520 is configured to monitor for alerts from user device 510 as further described by operation 400. User station 520 includes at least communication interface 521 and processing system 522. Upon the receipt of the alert at communication interface 521, user station 520 prepares to send a second alert using communication interface 521 to remote station 530. This second alert may include the location of the device, the safety-triggering event that occurred (lack of movement, button press, etc.), or any other information regarding the status of user device 510. The alert may be the same or different than the first alert from user device 510 to user station 520.

After the alert transmission from user station 520, the alert is received at remote station 530. Remote station 530 can be configured with communication interface 531 and processing system 532. Upon receipt of the alert, processing system 532 can be configured to display the alert, can be configured to transfer the alert to another device such as a server computer, desktop computer, tablet computer, or telephone, can be configured to store the alert, or any other possible action with the alert.

Examples of remote station 530 include server computers, desktop computers, tablet computers, and telephones. In one example, remote station 530 can create an alert that is transferred to user station 520, which may be forwarded to user device 510.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of global communication, comprising:
monitoring a user device for a safety-triggering event, wherein the user device is configured to operate in a hazardous environment;
transmitting a first alert from the user device to a user station outside of the hazardous environment based at least in part upon identification of the safety-triggering event; and
transmitting a second alert from the user station to a remote station upon the user station receiving the first alert,
wherein the user station is adjacent a vehicle.

2. The method according to claim 1, further comprising providing a third alert to the user device based at least in part upon identification of the safety-triggering event.

3. The method according to claim 2, not transmitting the first alert based at least in part on an acknowledgement of the third communication from the user device.

4. The method according to claim 1, wherein the safety-triggering event comprises non-movement of the user device.

5. The method according to claim 1, wherein the monitoring a user device for a safety-triggering event comprises a user-activated safety triggering event.

6. The method according to claim 1, wherein the transmitting at least a portion of the first alert comprises a blue-tooth-type communication.

7. The method according to claim 1, wherein the transmitting at least a portion of the second alert comprises satellite communication.

8. The method according to claim 1, wherein the hazardous environment comprises a hazardous electrical location and the user device is configured for use in hazardous electrical locations.

9. A safety system for hazardous locations, comprising:
a user device capable of monitoring for a safety-triggering event, providing a third alert to the user device based at least in part upon identification of the safety-triggering event, and further capable of transmitting a first alert outside of a hazardous environment based at least in part upon non-acknowledgement of the third alert; and
a user station, located generally outside the hazardous environment and adjacent a vehicle, capable of receiving the first alert and transmitting a second alert based at least in part upon receiving the first alert.

10. The system according to claim 9, further comprising a remote station capable of receiving the second alert and transmitting information to safety personnel.

11. The system according to claim 10, wherein the remote station is generally positioned away from the hazardous location.

12. The system according to claim 9, wherein the user device does not transmit the first alert based at least in part on an acknowledgement of the third communication from the user device.

13. The system according to claim 9, wherein the safety-triggering event comprises non-movement of the user device.

14. The system according to claim 10, wherein the user device transmits at least a portion of the first alert via a blue-tooth-type communication.

15. The system according to claim 9, wherein the transmitting at least a portion of the second alert comprises satellite communication.

16. The system according to claim 9, wherein the hazardous location comprises a hazardous electrical location.

17. The system of claim 9, wherein the user device is configured for use in hazardous electrical locations.

18. The system of claim 9, wherein the hazardous locations comprise a Class 1, or Class 2 location.

* * * * *